(12) United States Patent
See

(10) Patent No.: US 10,618,179 B1
(45) Date of Patent: Apr. 14, 2020

(54) REMOTE-CONTROLLED ROBOT FOR SPRAY PAINTING

(71) Applicant: Philip See, Ilmey City, MI (US)

(72) Inventor: Philip See, Ilmey City, MI (US)

( * ) Notice: Subject to any disclaimer, the term of this patent is extended or adjusted under 35 U.S.C. 154(b) by 0 days.

(21) Appl. No.: 16/251,022

(22) Filed: Jan. 17, 2019

Related U.S. Application Data

(60) Provisional application No. 62/636,323, filed on Feb. 28, 2018.

(51) Int. Cl.
| | | |
|---|---|---|
| *B25J 11/00* | (2006.01) | |
| *B05B 13/04* | (2006.01) | |
| *B25J 5/00* | (2006.01) | |
| *B25J 13/00* | (2006.01) | |
| *B25J 19/04* | (2006.01) | |
| *B25J 15/00* | (2006.01) | |
| *B25J 3/04* | (2006.01) | |

(52) U.S. Cl.
CPC ....... *B25J 11/0075* (2013.01); *B05B 13/0431* (2013.01); *B25J 3/04* (2013.01); *B25J 5/007* (2013.01); *B25J 13/006* (2013.01); *B25J 15/0019* (2013.01); *B25J 19/04* (2013.01)

(58) Field of Classification Search
CPC . B05B 13/0431; B05B 15/06; B05B 13/0436; B05B 13/005; B25J 11/0075; B25J 19/04; B25J 15/0019; B25J 15/02; B25J 3/04; B25J 13/006; B25J 5/007; E04D 7/00; B05C 5/00; B05C 5/02; B05D 1/02; Y10S 901/43

USPC ........................................................ 118/323
See application file for complete search history.

(56) References Cited

U.S. PATENT DOCUMENTS

| | | | |
|---|---|---|---|
| 4,630,567 A | 12/1986 | Bambousek | |
| 5,248,341 A | 9/1993 | Berry | |
| 5,381,597 A | 1/1995 | Petrove | |
| 5,465,525 A * | 11/1995 | Mifune | A01M 7/00 180/167 |
| 5,851,580 A * | 12/1998 | Amberg | E21D 11/105 427/8 |
| 6,024,147 A | 2/2000 | Hunter | |
| 6,117,256 A | 9/2000 | Hunter | |
| 6,126,766 A | 10/2000 | Hunter | |
| 6,358,344 B1 | 3/2002 | Hunter | |
| 6,416,854 B2 | 7/2002 | Hunter | |
| 6,981,657 B1 | 1/2006 | West | |

(Continued)

*Primary Examiner* — Laura Edwards
(74) *Attorney, Agent, or Firm* — Linda Lewis Attorney at Law

(57) ABSTRACT

A remote-controlled robotic spray painter is used to evenly coat the surface of a corrugated metal roof with paint by having frame with four wheels having 4-wheel drive. Mounted on the front of the frame is a camera with a transmitter and a servo motor to move the camera and at least one spray nozzle with an on/off spray servo. On the rear of the frame is a speed sensor, a drive motor to drive the 4 wheels and control the speed and direction of the drive motors, and a microprocessor. A remote control transmitter/receiver receives the image from the camera and through operator controls moves the camera to the desired position, controls the speed and direction of the drive motor, and starts and stops spraying using a nozzle servo. The robot has no steering mechanism, as it is simply driven in a straight line, forward and reverse.

19 Claims, 5 Drawing Sheets

(56) References Cited

U.S. PATENT DOCUMENTS

| | | | |
|---|---|---|---|
| 8,726,833 B2 * | 5/2014 | Logan | B66F 9/12 118/323 |
| 2016/0121486 A1 | 5/2016 | Lipinski | |

* cited by examiner

REMOTE-CONTROLLED ROBOT FOR SPRAY PAINTING

CROSS-REFERENCE TO RELATED APPLICATIONS

This application claims the benefit of provisional patent application 62/636,323 filed Feb. 28, 2018.

STATEMENT REGARDING FEDERALLY SPONSORED RESEARCH

Not Applicable.

APPENDIX

Not Applicable.

BACKGROUND OF THE INVENTION

Field of the Invention

The present invention relates to a robot for spray painting, and more particularly to a remote-controlled robot on wheels for spray painting a roof. The remote-controlled robot has three functions that are remotely controlled: the attitude of the camera, the direction and speed of rotation of the drive wheels and the on/off of the spray nozzles. The direction of the spray nozzles can be remotely controlled or manually controlled. There is no steering mechanism, as the robot only moves forward and reverse.

Related Art

Prior art devices have been used for spraying a coating on a roof. Most prior art devices have manual control allowing the sprayer to be directed to the desired location, to control the speed of the drive motors, and to turn the sprayer on and off. The manual control involves the seated control person on the spraying device. No prior art devices were found that allows the spraying device to be remote controlled, as does the present invention. Further, no prior art devices were found that did not need steering mechanisms to operate the device.

There has been a desire for a simple, ease to move spraying device that allows an even coating of a roof in the roof coating industry. Manual application of coating materials is a back-breaking process of bending over to carefully apply a vertical spray of coating so that the coverage is even, especially at the edge of the roof, which tends to be under-applied or over-applied. The present invention uses a mounted camera to provide the view of the roof to allow the operator to evenly apply the coating. Consistent coating thickness is achieved by controlled and consistent spray pressure and the speed of the robot controlled by the drive motor of the wheels. Additionally, remote controls to the position the camera, the direction of the spray nozzles and the speed of the drive motor allows the operator to remotely control the spraying device and effectively apply the coating evenly.

Examples of known prior art devices are described in the references listed below, which are hereby incorporated by reference.

The U.S. Pat. No. 6,126,766 discloses a base with four wheels, a speed controlled drive, nozzles, and a pressurized sprayer. However, this reference does not disclose a camera transmitting to a remote receiver to position the nozzles to evenly coat a corrugated roof. Further, this device is manually controlled and steered.

The U.S. Pat. No. 6,358,344 discloses a base with four wheels, a speed controlled drive, nozzles, and a pressurized sprayer. However, this reference does not disclose a camera transmitting to a remote receiver to position the nozzles to evenly coat a corrugated roof. Further, this device is manually controlled and steered.

Neither of the above patents disclose the invention as claimed.

SUMMARY OF THE INVENTION

The remote-controlled robotic spray painter is used to evenly coat the surface of a corrugated metal roof with paint by having frame with four wheels having 4-wheel drive. Mounted on the front of the frame is a camera with a transmitter and a servo motor to move the camera and at least one spray nozzle with an on/off spray servo. On the rear of the frame is a speed sensor, a drive motor to drive the 4 wheels and control the speed and direction of the drive motors. A controller transmitter/receiver receives the image from the camera and through operator controls moves the camera to the desired position, controls the speed and direction of the drive motor, and starts and stops spraying using a nozzle servo. The robot has no steering mechanism, as it is simply driven in a straight line, forward and reverse.

In a preferred embodiment, the remote-controlled robotic sprayer used to evenly coat the surface of a roof with a coating comprising a frame with four wheels;

wherein guides are mounted on the frame proximate the wheels;

wherein the frame has a front, a rear, a left side and a right side;

mounted on the front of the frame is an at least one camera with a transmitter and a camera servo motor with a receiver;

mounted on the front of the frame and forward from the frame is at least one adjustable spray nozzle connected to a nozzle servo motor to open and close the nozzle;

fluidly connected to the spray nozzle is at least one spray hose;

mounted on the rear of the frame is a speed sensor to sense the speed of the wheels, and a drive motor to drive the four wheels and control the speed and direction of the drive motors; and mounted on the rear frame is a microprocessor with a transmitter/receiver;

a transmitter/receiver controller in communication with the microprocessor having operator controls which receive the image from the camera and transmits to the microprocessor to activate the spray nozzle servos to open and close the nozzle and activate the camera servo motor the adjusts the attitude of the camera to the desired position, and transmits to adjust the speed and direction of the drive motors;

wherein the drive motor has a low speed and a high speed and a forward and a reverse;

wherein the attitude of the camera is automatically directed up for high speed and down for low speed;

wherein when the nozzle servo is initiated to open the nozzle and start spraying, the drive motor is started in low speed in reverse simultaneously; and wherein the motion of the robot forward and reverse by the four wheels is guided by the guides.

A method of coating a roof using the remote-controlled robotic sprayer on a metal standing seam roof having an edge comprises:

positioning the robotic sprayer on roof, where the wheels rest on the standing seams of the roof proximate the edge of the roof;

positioning the guides to align with the seams;

attaching to the hoses a source of coating material;

pressuring the coating material to the spray nozzles with the nozzles in the closed position;

positioning the nozzles to direct the coating to the part of the roof to be coated;

activating the nozzle servo to open the nozzle and start spraying;

simultaneously initiating the movement of the wheels at low speed in reverse by the drive motor using the remote control; and monitoring the coating process using the camera transmission by remote control.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
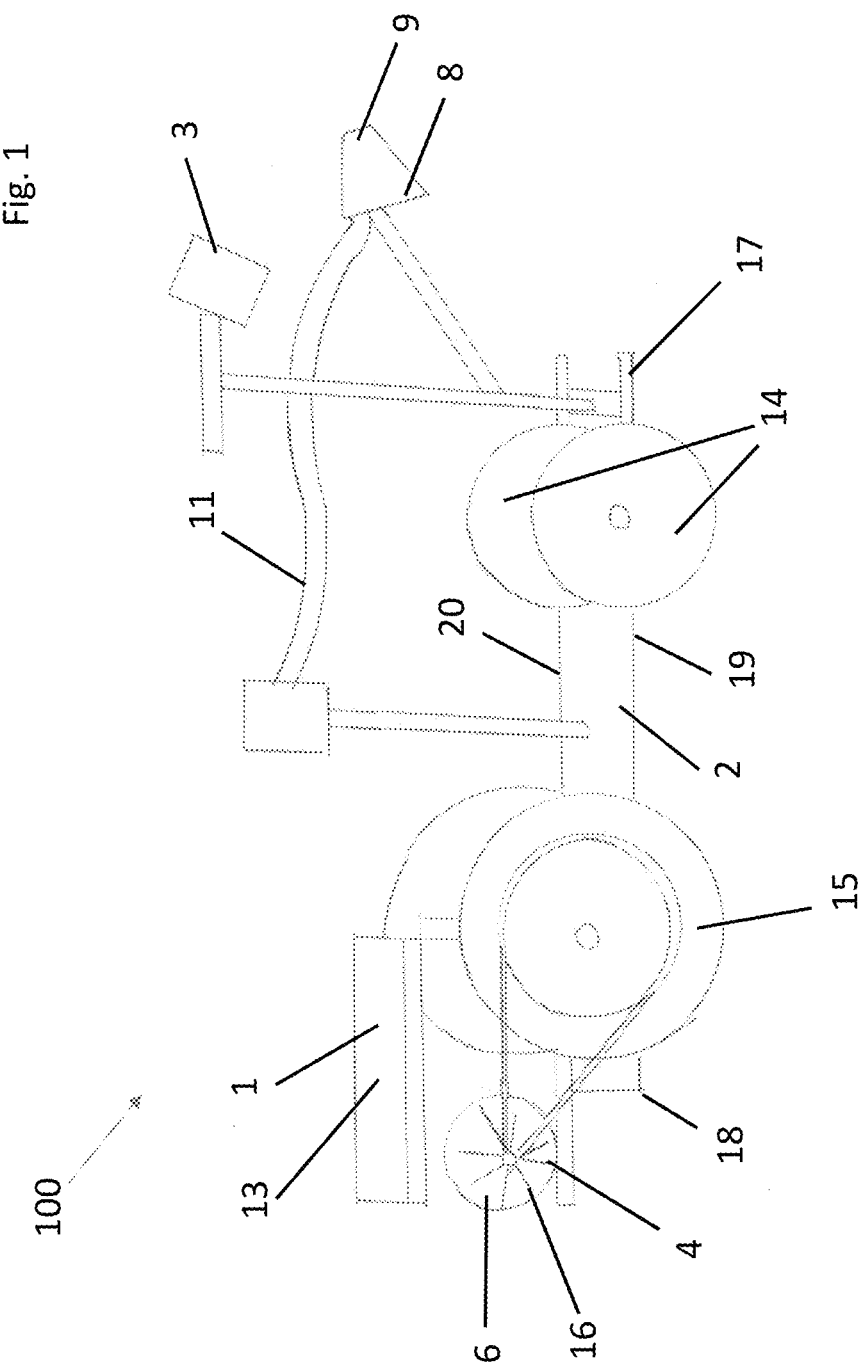
FIG. 1 is a left side view of the device of this invention.
Figure 2:
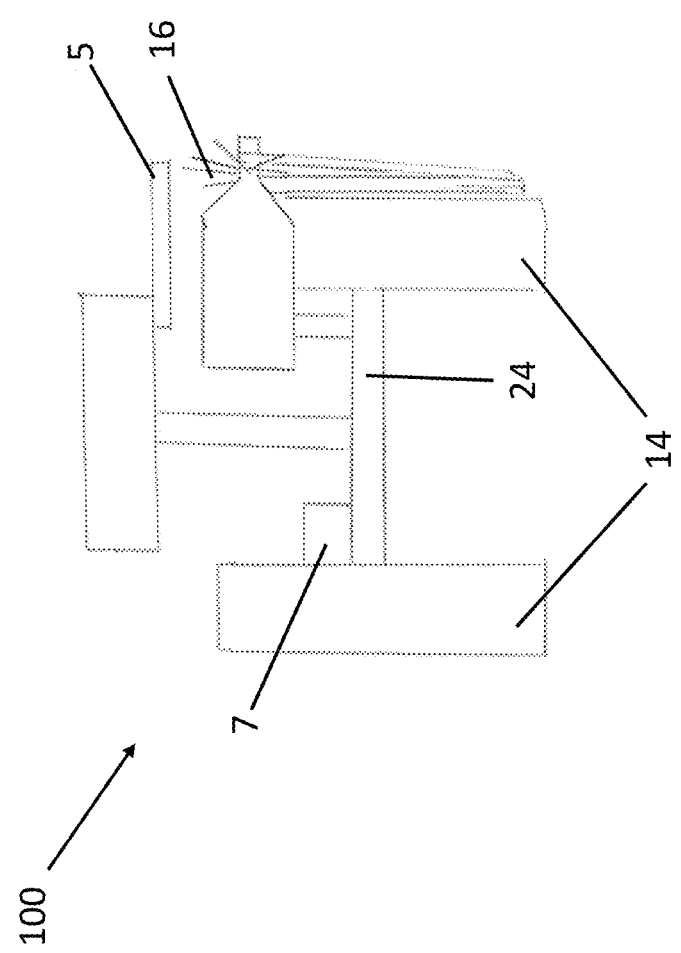
FIG. 2 is a partial rear view of the device of this invention.
Figure 3:
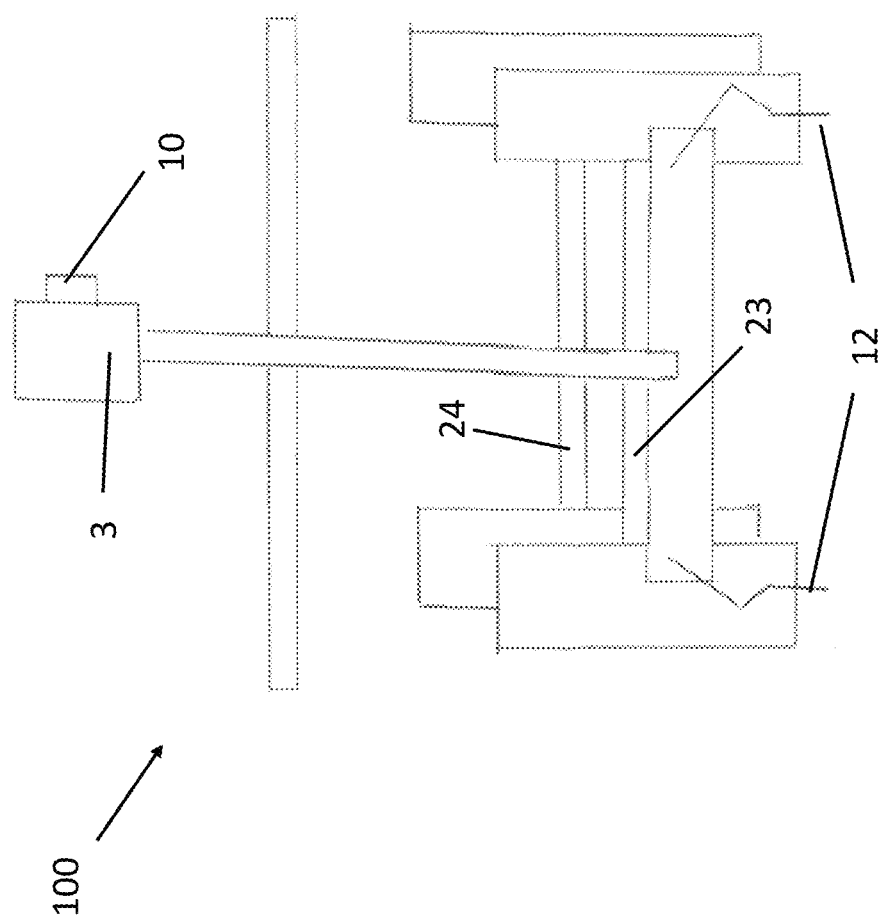
FIG. 3 is a partial front view of the device of this invention.
Figure 4:
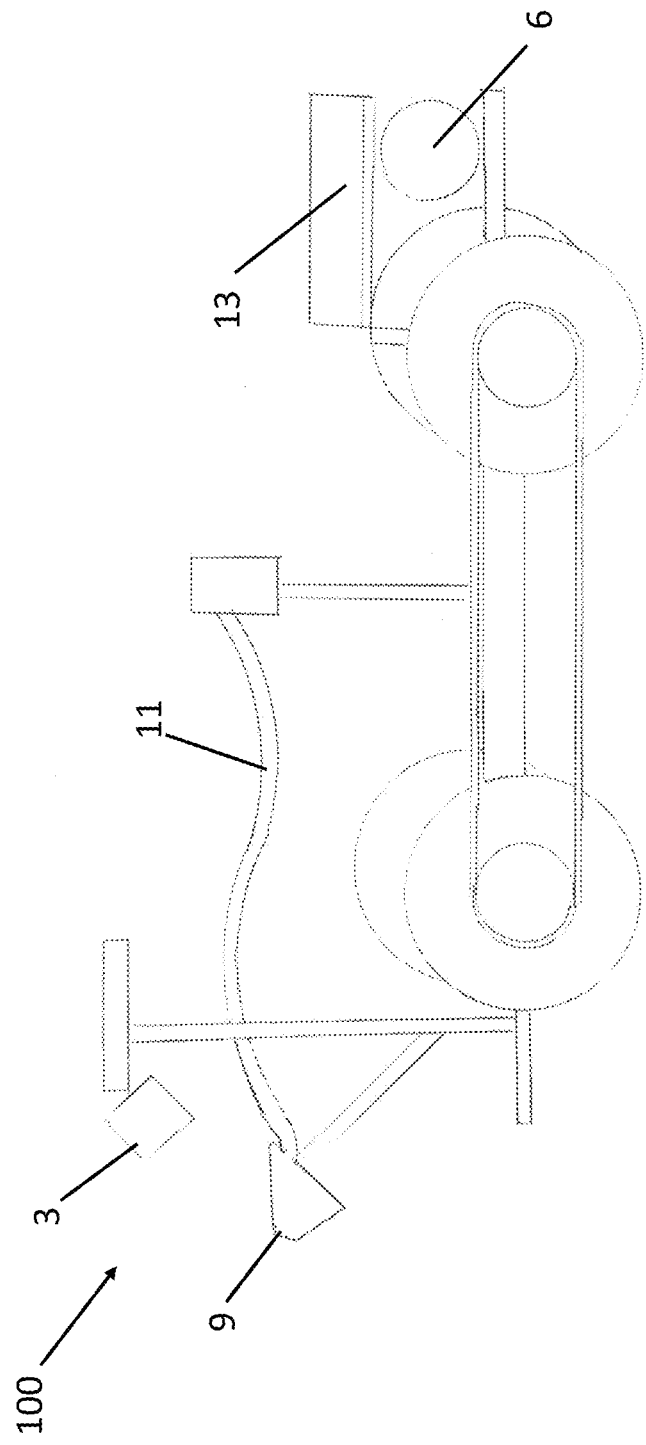
FIG. 4 is a right side view of the device of this invention.
Figure 5:
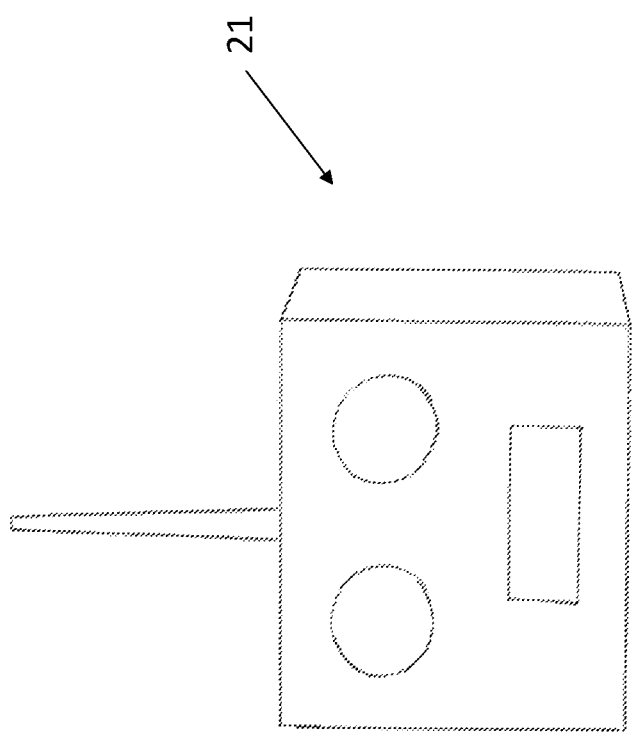
FIG. 5 is a top view of the screen of the controller of this invention.

The claimed remote-controlled robot for painting a roof is disclosed in FIGS. 1-5. FIG. 1 shows a four wheel drive robot 100 having a frame 2 and two or more wheels 14. In a preferred embodiment, the robot has four wheels. The frame 2 has a front 17, a rear 18, a left side 19 and a right side 20. As shown in FIG. 1, the robot has two front wheels and two back wheels. In a preferred embodiment, the robot has a front axle 23 and a rear axle 24. The left rear wheel 15 has a wheel-mounted sprocket 16 attached by a roller drive chain to telemetry speed sensor 4 cogs mounted proximate to a Hall-effect switch 5. The switch is a speed sensor that senses the movement of the cogs to determine the speed of the turning wheels, and the speed of movement of the robot. The wheel drive motor 6 is mounted between the two rear wheels above the rear axle. The motor has a three speed shifter assembly 7 mounted proximate the right rear wheel. The drive motor has at least a high speed and a low speed, and a forward and a reverse direction.

Mounted on a platform above the rear axle are the at least one drive battery 1. Preferably, there are at least two batteries, so that when one battery has its power depleted, the robot can switch to the second one without down time. The switch to the second battery can be made automatically using a lithium ion circuit. Also mounted on the platform is a processor 13 which receives transmissions when the switch is made indicating that one battery is dead. Preferably the processor 13 is a microprocessor with a transmitter/receiver which is in communication with a controller 21 which is a transmitter/receiver. The controller 21 transmitter/receiver can be a handheld device, a computer device, a cell phone device, or other type of electronic transmitter/receiver. In a preferred embodiment, the controller transmitter/receiver 21 is telemetry device that includes a display of speed and battery voltage. A preferred controller device is the Spektrum® DX telemetry system. Spektrum™ telemetry technology displays real-time information on battery voltage, wheel rpm (i.e., speed), etc. on a LCD screen. The display of speed and battery voltage are critical to the coating thickness being applied to the roof, as the pressure of the spraying is constant. If the speed is too great, the coating will be too thin. If the speed is too low, the coating will be too thick.

In a preferred embodiment, mounted on the platform is also is a radio receiver with the microprocessor controller module. The microprocessor is used to receive and transmit to the drive motor, the camera servos 10 and the nozzle servos 8. It also receives and transmits to the controller 21.

At the front of the robot 100 is mounted a camera 3 which is positioned using a camera servo motor 10. In a preferred embodiment, the camera has a transmitter. The camera transmits the image to the controller 21, and is displayed on the screen of the controller. Preferably, the screen is mounted on a hand held control panel for the controller The camera servo motor 10 receives transmissions from the controller and changes the position of the camera, and the camera display, to allow the operator to see where coating needs to be applied and how well the coating is being applied. The camera has two positions: an up position for when the drive motor is driving at a high speed, and a down position when the drive motor is driving at a low speed. In the up position, the camera displays the forward edge of the roof so the robot can be positioned at the edge of the roof. In the down position, the camera displays the portion of the roof being painted to help with the application of paint. The camera servo motor can be controlled using the display screen of the controller 21 shown in FIG. 5. The controller 21 is able to control three functions: the position (attitude) of the camera 3, the speed and direction of the wheel drive motor 6, and the on/off of the nozzle servo motors of the two sprayer nozzles 9. In a preferred embodiment, the controller 21 also displays the voltage of the battery.

Below the camera and projecting in front of the front axle 23 are the at least one spray nozzle 9 and the at least one sprayer servo motor 8. Fluidly connected to the at least one spray nozzle 9 is at least one hose 11 which is fluidly connected to at least one pressurized coating container, not shown. The coating material is pumped through the hose 11 into the sprayer nozzle 9. Using the controller 21, the sprayer nozzles are opened or closed using nozzle servos. Using the Hall-effect switch 5, the speed of the drive motor is controlled using the controller 21.

In use, the robot is positioned on a standing seam roof, with the drive wheels resting on two adjacent seams. Two guides 12 are placed in front of the front wheels and positioned to ride along the two adjacent seams serve to provide alignment of the motion of the robot along the adjacent seams. Preferably the guides 12 are adjustable, allowing them to be re-positioned as needed. No turning mechanism is required. Since the sprayer nozzles 9 project in front of the front wheels, the front wheels never approach the edge of the roof. The robot is positioned proximate the edge of the roof, and the position determined by the camera and the sprayers. The coating is pumped to the sprayers, and the drive motor is started to move the robot away from the edge as the coating is applied.

The nozzle servos, the drive motor and the camera servos are synchronized so that, with the flip of one switch, the nozzles start spraying, the drive motor starts moving at low speed in reverse, away from the edge of the roof, and the camera attitude is low, tracking the coating of the roof.

When the single track of coating is completed, the robot is repositioned at the next seam over (either right or left) and the robot moved proximate the edge of the roof. The next track is then coated.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A remote-controlled robotic sprayer used to evenly coat the surface of a roof with a coating comprising:
    a frame;
        wherein mounted on the frame are at least two wheels; and
        wherein the frame has a front, a rear, a left side and a right side;
    a microprocessor;
        wherein the processor is in communication with a controller;
        wherein the controller is a remote control transmitter and receiver having operator controls;
    at least one camera mounted proximate the front of the frame;
        wherein the at least one camera transmits photographic data to the controller; and
        wherein attached to the at least one camera is a camera servo motor which receives transmissions from the controller and positions the at least one camera;
    at least one adjustable spray nozzle;
        wherein the at least one adjustable spray nozzle is mounted on the front of the frame and forward from the frame; and
        wherein the least one adjustable spray nozzle is connected to an at least one nozzle servo motor;
        wherein the controller transmits to the at least one nozzle servo motor to open and close the at least one adjustable spray nozzle;
    at least one spray hose;
        wherein the at least one spray hose is fluidly connected to the at least one spray nozzle;
    a drive motor attached to the at least two wheels;
        wherein the drive motor drives the at least two wheels;
        wherein the drive motor has a lower speed and a higher speed and a forward and a reverse;
        wherein the drive motor receives transmissions from the controller;
        wherein at least one guide is mounted on the front of the frame proximate the wheels to position the at least one spray nozzle relative to roof surface to coat the roof;
    a speed sensor proximate the at least two wheels which transmits speed to the controller;
        wherein the controller has a screen which displays an image from the at least one camera;
        wherein the controller transmits to activate the at least one nozzle servo to open and close the nozzle;
        wherein the controller activates the camera servo motor to adjust a position of the camera to the desired position; and
        wherein the controller transmits to the drive motor to adjust the speed and direction of the drive motor.

2. The remote-controlled robotic sprayer of claim 1, wherein the sprayer has four wheels.

3. The remote-controlled robotic sprayer of claim 2, wherein the drive motor is a 4-wheel drive motor.

4. The remote-controlled sprayer of claim 1, wherein the the at least one camera is configured to an up position for higher speed and to a down position for lower speed.

5. The remote-controlled sprayer of claim 4, wherein the nozzle servo is configured to initiate the nozzle and start the drive motor in lower speed in reverse simultaneously.

6. The remote-controlled sprayer of claim 5, wherein the drive motor is configured to drive forward and reverse and is guided by the at least one guide to assist positioning the spray nozzle relative to roof surface to coat the roof.

7. The remote-controlled sprayer of claim 6, wherein the at least one guide comprises two guides that are proximate the two front wheels and are positioned to provide alignment of the motion of the sprayer along the roof's adjacent seams; and
    wherein the sprayer does not have an additional steering mechanism.

8. A method of coating a roof comprising the steps of providing the remote-controlled robotic sprayer of claim 4 on a metal standing seam roof having an edge:
    positioning the robotic sprayer on roof, where the four wheels rest on adjacent standing seams of the roof proximate the edge of the roof;
    positioning the at least one guide to align with the seams;
    attaching to the at least one hose a source of coating material;
    pressuring the coating material to the at least one spray nozzle;
    wherein the at least one spray nozzle is in a closed position;
    positioning the at least one spray nozzle to direct the coating to the part of the roof surface to be coated;
    activating the at least one nozzle servo using the controller to open the at least one nozzle and start spraying;
    simultaneously initiating the movement of the wheels at lower speed in reverse by the drive motor using the remote control; and
    simultaneously adjusting the position of the at least one camera to a down position using the camera servo motor.

9. The method of claim 8, wherein the position of the at least one camera is automatically directed to an up position for higher speed and to the down position for lower speed.

10. The method of claim 9, wherein when the at least one nozzle servo is initiated to open the at least one nozzle and start spraying, the drive motor is started in lower speed in reverse simultaneously.

11. The method of claim 10, wherein the controller displays voltage and speed on a screen.

12. The remote-controlled sprayer of claim 6, wherein the at least one guide comprises two guides on two front wheels and positioned to provide alignment of the motion of the sprayer along the roof's adjacent seams.

13. A method of coating a roof comprising the steps of providing a remote-controlled robotic sprayer, wherein the sprayer comprises:
   a frame;
      wherein mounted on the frame are four wheels; and
      wherein the frame has a front, a rear, a left side and a right side;
   a microprocessor;
      wherein in communication with the microprocessor is a controller;
      wherein the controller is a remote control transmitter and receiver having operator controls;
   at least one camera mounted on the front of the frame;
      wherein the at least one camera transmits photographic data to the controller; and
      wherein attached to the at least one camera is a camera servo motor which receives transmissions from the controller;
   at least one adjustable spray nozzle;
      wherein the at least one adjustable spray nozzle is mounted on the front of the frame and forward from the frame;
      wherein the least one adjustable spray nozzle is connected to an at least one nozzle servo motor;
      wherein the controller transmits to the at least one nozzle servo motor to open and close the at least one adjustable spray nozzle;
   at least one spray hose;
      wherein the at least one spray hose is fluidly connected to the at least one spray nozzle;
   a drive motor attached to the four wheels;
      wherein the drive motor drives the four wheels;
      wherein the drive motor has a lower speed and a higher speed and a forward and a reverse;
      wherein the drive motor receives transmissions from the controller;
   a speed sensor proximate the four wheels which transmits speed to the controller;
      wherein the controller has a screen which displays an image from the camera;
      wherein the controller transmits to activate the at least one nozzle servo to open and close the at least one nozzle;
      wherein the controller activates the camera servo motor to adjust the position of the at least one camera to the desired position;
      wherein the controller transmits to the drive motor to adjust the speed and direction of the drive motor;
      wherein the drive motor is a 4-wheel drive motor;
      wherein at least one guide is mounted on the frame proximate the wheels;
      positioning the robotic sprayer on roof, where the four wheels rest on adjacent standing seams of the roof proximate an edge of the roof;
      positioning the at least one guide to align with the seams;
      attaching to the at least one spray hose a source of coating material;
      pressuring the coating material to the at least one spray nozzle;
      wherein the at least one spray nozzle is in a closed position;
      positioning the at least one spray nozzle to direct the coating to coat a metal standing seam roof edge;
      activating the at least one nozzle servo using the controller to open the at least one nozzle and start spraying;
      simultaneously initiating the movement of the wheels at lower speed in reverse by the drive motor using the remote control; and
      simultaneously adjusting the position of the at least one camera to a down position using the camera servo motor.

14. The method of claim 13, wherein the position of the at least one camera is automatically directed to an up position for higher speed and to the down position for lower speed.

15. The method of claim 14, wherein when the at least one nozzle servo is initiated to open the at least one nozzle and start spraying, the drive motor is started in lower speed in reverse simultaneously.

16. The method of claim 15, wherein the motion of the robotic sprayer forward and reverse by the four wheels is guided by the at least one guide.

17. A remote-controlled sprayer used to evenly coat the surface of a roof with a coating comprising:
   a frame;
      wherein mounted on the frame are four wheels; and
      wherein the frame has a front, a rear, a left side and a right side;
   a microprocessor;
      wherein in communication with the microprocessor is a controller;
      wherein the controller is a remote control transmitter and receiver having operator controls;
   at least one camera mounted on the front of the frame;
      wherein the controller has a screen that displays voltage and speed;
      wherein the at least one camera transmits photographic data to the controller; and
      wherein attached to the at least one camera is a camera servo motor which receives transmissions from the controller;
   at least one adjustable spray nozzle;
      wherein the at least one adjustable spray nozzle is mounted on the front of the frame and forward from the frame;
      wherein the least one adjustable spray nozzle is connected to an at least one nozzle servo motor;
      wherein the controller transmits to the at least one nozzle servo motor to open and close the at least one adjustable spray nozzle;
   at least one spray hose;
      wherein the at least one spray hose is fluidly connected to the at least one spray nozzle;
   a drive motor attached to the four wheels;
      wherein the drive motor drives the four wheels;
      wherein the drive motor has a lower speed and a higher speed and a forward and a reverse;
      wherein the drive motor receives transmissions from the controller;
   a speed sensor proximate the four wheels which transmits speed to the controller;
      wherein the controller has a screen which displays an image from the camera;

wherein the controller transmits to activate the at least one nozzle servo to open and close the at least one nozzle;

wherein the controller activates the camera servo motor to adjust the position of the at least one camera to the desired position;

wherein the controller transmits to the drive motor to adjust the speed and direction of the drive motor;

wherein the drive motor is a 4-wheel drive motor; and wherein at least one guide is mounted on the frame proximate the wheels to position the at least one spray nozzle relative to roof surface to coat the roof.

18. The remote-controlled sprayer of claim 17, wherein the position of the at least one camera is automatically directed to an up position for higher speed and to a down position for lower speed.

19. The remote-controlled sprayer of claim 18, wherein the at least one nozzle servo is configured to initiate the nozzle and start the drive motor in lower speed in reverse simultaneously.

* * * * *